United States Patent
Betti et al.

(10) Patent No.: US 7,322,917 B2
(45) Date of Patent: Jan. 29, 2008

(54) EMBOSSING CYLINDER WITH INTERCHANGEABLE SLEEVE AND WITH SYSTEM FOR LOCKING THE SLEEVE AT THE ENDS AND EMBOSSING MACHINE COMPRISING SAID CYLINDER

(75) Inventors: Giulio Betti, Lucca (IT); Fabrizio Lorenzi, Lucca (IT); Walter Di Nardo, Lucca (IT)

(73) Assignee: Fabio Perini, S.p.A., Lucca (IT)

( * ) Notice: Subject to any disclaimer, the term of this patent is extended or adjusted under 35 U.S.C. 154(b) by 537 days.

(21) Appl. No.: 10/496,152

(22) PCT Filed: Nov. 20, 2002

(86) PCT No.: PCT/IT02/00733

§ 371 (c)(1),
(2), (4) Date: May 20, 2004

(87) PCT Pub. No.: WO03/045679

PCT Pub. Date: Jun. 5, 2003

(65) Prior Publication Data

US 2005/0020422 A1    Jan. 27, 2005

(30) Foreign Application Priority Data

Nov. 23, 2001  (IT)  ............................. FI2001A0223

(51) Int. Cl.
*A01B 29/00* (2006.01)

(52) U.S. Cl. ........................ 492/30; 492/45; 492/47; 492/60

(58) Field of Classification Search ................ 492/30, 492/40, 45, 47, 48, 49, 56, 60; 160/375
See application file for complete search history.

(56) References Cited

U.S. PATENT DOCUMENTS

| | | | | |
|---|---|---|---|---|
| 2,005,885 A | * | 6/1935 | Brindley | 492/45 |
| 2,658,262 A | * | 11/1953 | Clements | 492/23 |
| 3,739,722 A | | 6/1973 | Zottoli | |
| 4,003,114 A | | 1/1977 | Lewicki et al. | |
| 4,007,680 A | * | 2/1977 | Pfleger et al. | 101/153 |

(Continued)

FOREIGN PATENT DOCUMENTS

EP  0 009 360 B2  4/1980

(Continued)

*Primary Examiner*—Essama Omgba
(74) *Attorney, Agent, or Firm*—Breiner & Breiner, LLC

(57) ABSTRACT

The rotating cylinder for processing a web material comprises an essentially rigid cylindrical core (13), on which is fitted an interchangeable sleeve (45) of elastically expandable material whose rigidity is less than that of the material of the core; the sleeve is axially and angularly fixable to the core and is provided on its outer surface with a relief pattern. For each end of the 3 cylinder, there is provided at least one corresponding mechanical locking member which can be fixed to the corresponding end of the core of the cylinder and which interacts with the corresponding end of the interchangeable sleeve to lock the interchangeable sleeve angularly with respect to the core of the cylinder.

6 Claims, 3 Drawing Sheets

U.S. PATENT DOCUMENTS

| | | | |
|---|---|---|---|
| 4,044,678 A * | 8/1977 | Rasmussen | 101/378 |
| 4,144,813 A | 3/1979 | Julian | |
| 4,150,622 A * | 4/1979 | Stollenwerk et al. | 101/378 |
| 4,716,637 A * | 1/1988 | McIntosh et al. | 492/39 |
| 4,782,568 A * | 11/1988 | Halttula | 492/47 |
| 4,800,644 A * | 1/1989 | Muellenberg | 29/525.08 |
| 5,096,527 A | 3/1992 | Biagiotti | |
| 5,490,458 A * | 2/1996 | Stuart | 101/375 |
| 5,904,095 A | 5/1999 | Nelson | |
| 6,053,232 A | 4/2000 | Biagiotti | |
| 6,394,943 B1 * | 5/2002 | Cormier et al. | 492/47 |
| 6,436,022 B1 * | 8/2002 | Zaoralek | 492/46 |
| 6,620,084 B2 * | 9/2003 | Daily et al. | 492/45 |
| 6,874,415 B2 * | 4/2005 | Hoffmann et al. | 101/217 |
| 2002/0040651 A1 * | 4/2002 | McEachem | 101/382.1 |
| 2004/0242392 A1 * | 12/2004 | Betti et al. | 492/28 |
| 2004/0255804 A1 * | 12/2004 | Hoffmann et al. | 101/375 |
| 2005/0020422 A1 * | 1/2005 | Betti et al. | 492/56 |
| 2007/0015648 A1 * | 1/2007 | Biagiotti et al. | 492/46 |

FOREIGN PATENT DOCUMENTS

| | | |
|---|---|---|
| EP | 0 181 726 A2 | 5/1986 |
| EP | 0 181 726 A3 | 5/1986 |
| EP | 0 836 928 A1 | 4/1998 |
| JP | 06280855 A * | 10/1994 |
| WO | WO 99/44814 | 9/1999 |

* cited by examiner

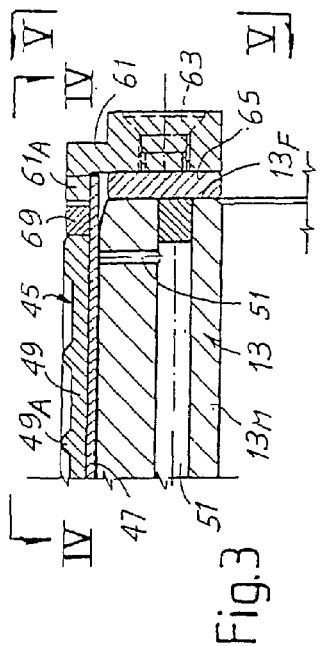
Fig.3
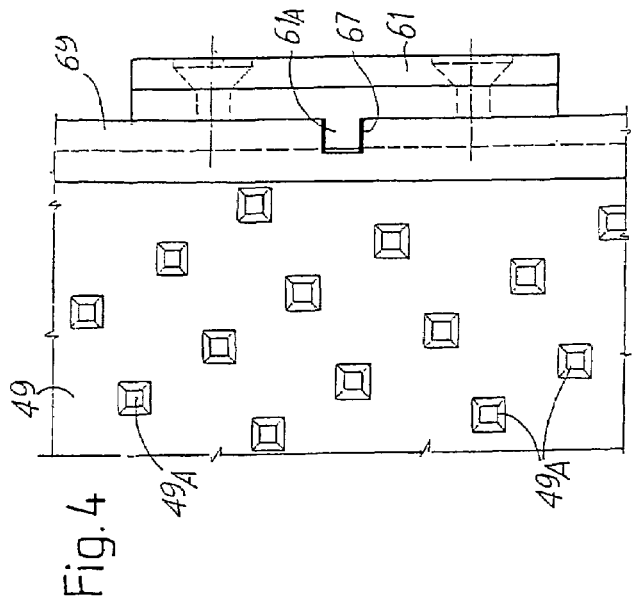
Fig.4
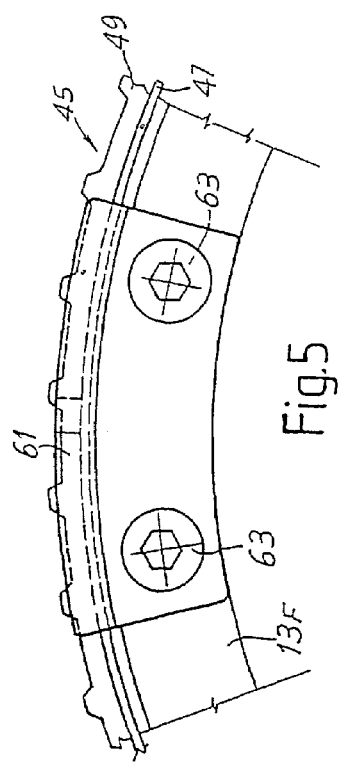
Fig.5
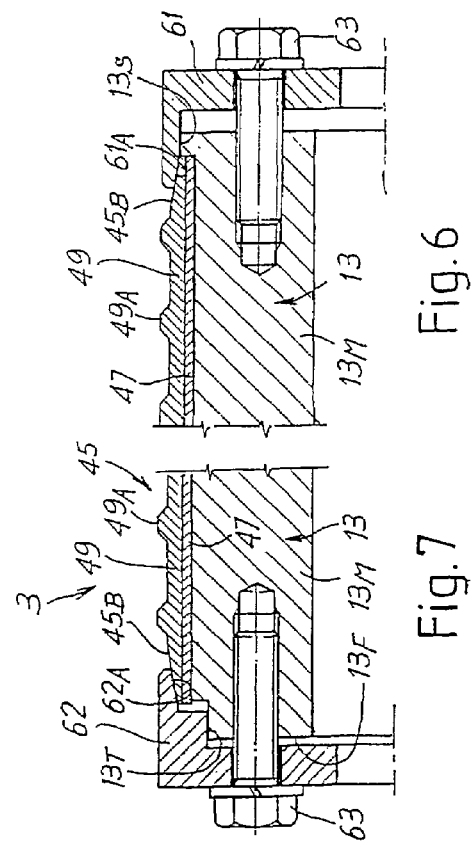
Fig.6
Fig.7

EMBOSSING CYLINDER WITH INTERCHANGEABLE SLEEVE AND WITH SYSTEM FOR LOCKING THE SLEEVE AT THE ENDS AND EMBOSSING MACHINE COMPRISING SAID CYLINDER

TECHNICAL FIELD

The present invention relates to a rotating cylinder for processing a web material, and particularly but not exclusively to an embossing cylinder for embossing sheet materials, such as tissue paper or the like. More particularly, the invention relates to a rotating cylinder of the type comprising an essentially rigid cylindrical central core, on which is fitted an interchangeable sleeve made from elastically expandable material having a lower rigidity than the material of the core.

The invention also relates to a device comprising at least one rotating cylinder of the aforesaid type, for example an embossing machine or a printing machine.

The invention also relates to an interchangeable sleeve for a rotating cylinder, particularly an embossing cylinder or a printing cylinder of the aforesaid type.

PRIOR ART

In the paper converting industry, and in other industries in which continuous web materials are processed, various processes and operations are carried out on these materials by means of rotating cylinders which act on the web material. Of these operations, printing and embossing operations are particularly important for the purposes of the present invention. In the processing of tissue paper for the production of rolls of toilet paper, rolls of paper towels, paper tissues and napkins and the like, the paper material is usually subjected to a mechanical operation of embossing, which deforms and/or breaks the fibers to increase the absorbency, volume and softness of the material.

Embossing is also used to imprint a particular pattern on the web material.

Examples of embossing devices used for these purposes are described in U.S. Pat. No. 6,053,232, U.S. Pat. No. 5,096,527 and WO-A-9944814.

One of the problems encountered in this particular technology consists in the necessity of changing the embossing patterns with a certain frequency, when changing from one production batch to another, in order to adapt to the different characteristics of the material used, where different needs and/or market requirements have to be met.

Similar problems are encountered in the printing of web materials, particularly paper materials. In this case also, the patterns have to be replaced at a certain rate.

Conventionally, an embossing cylinder consists of a single block of steel or other hard material capable of withstanding high bending stresses without excessive deformation. The outer surface of the cylinder is engraved mechanically, chemically, by laser treatment, or by other methods, to form the embossing pattern, which essentially consists of a combination of points or protuberances of various shapes, which process the web material which passes between the embossing cylinder and a pressure roller, or between two embossing cylinders having complementary patterns.

In this case, the replacement of the embossing pattern requires the replacement of the whole cylinder. The costs of the cylinder and of the engraving operations are very high. Consequently, if a given number of interchangeable embossing patterns is required, it is necessary to store a corresponding number of expensive cylinders, and also to carry out particularly lengthy manual operations to replace the cylinder, with consequent loss of production as a result of the machine downtime.

To alleviate this problem, systems for facilitating the replacement of the pattern on the embossing cylinder have been investigated. EP-A-0836928 describes an embossing device in which each embossing cylinder consists of an elongated internal cylindrical core on which an interchangeable sleeve is fitted. This sleeve carries the embossing pattern. The interchangeable sleeve is elastic and can be expanded diametrically to facilitate its fitting onto the central core of the cylinder and its removal therefrom. The fitting and removal of the sleeve are facilitated by a compressed air system which serves to expand the interchangeable sleeve to facilitate its removal from the core or to facilitate its fitting.

This system is also used in printing cylinders for replacing a printing block formed on an interchangeable sleeve. Printing cylinders of this type are described in EP-A-0181726, EP-A-0009360 and U.S. Pat. No. 4,144,813.

One of the problems arising in this type of solution, and in the embossing industry in particular, consists in the tendency of the sleeve to slip or rotate on the central core of the cylinder. This is due to the elasticity of the material used, the tangential forces applied, and the heating to which these mechanical elements are subject during operation. This slippage creates problems of wear and, particularly in double embossing units, a misalignment of the positions of the engravings on the two embossing rollers with respect to each other. To prevent the angular displacement of the interchangeable sleeve with respect to the core of the cylinder, studies have been carried out on shape couplings consisting of longitudinal grooves and longitudinal ribs on the two components forming the cylinder. However, this solution is not satisfactory, particularly when the interchangeable sleeve is made from glass fiber reinforced plastic. The presence of continuous glass fibers positioned helically in the body of the sleeve makes the formation of grooves or projections unsuitable. The sleeve must have a smooth inner surface.

OBJECTS AND SUMMARY OF THE INVENTION

The object of the present invention is to provide a cylinder for processing a web material in sheet form, and particularly to provide an embossing cylinder, with an interchangeable sleeve, which does not have the drawbacks of conventional cylinders.

In particular, the object of the present invention is to provide an embossing cylinder with an interchangeable sleeve in which the interchangeable sleeve can be locked angularly with respect to the core of the cylinder.

This and other objects and advantages, which the following text will make clear to those skilled in the art, are essentially achieved with a rotating cylinder comprising a substantially rigid axial cylindrical core on which is fitted an interchangeable sleeve of elastically expandable material whose rigidity is less than that of the material of the core, and additionally comprising, at each end of the cylinder, at least one mechanical locking member which can be fixed to the corresponding end of the core of the cylinder and which interacts with the corresponding end of the interchangeable sleeve to lock said interchangeable sleeve angularly with respect to the core of the embossing cylinder.

Advantageously, the two mechanical locking members can be fixed to the corresponding end faces of the core of the cylinder. Thus the whole cylindrical surface of the central core remains free and the axial length of the interchangeable sleeve can be equal to the axial length of the core. Furthermore, the locking is facilitated because the locking members are accessible from the end faces. The locking is advantageously achieved by means of screws, although other systems of locking the parts together are not ruled out.

In a possible embodiment, each of the mechanical locking members comprises a bracket which can be fitted onto the end faces of the cylinder and which is provided with at feast one appendage extending onto the cylindrical surface of the cylinder and engaging with the interchangeable sleeve.

Advantageously, the interchangeable sleeve can consist of two coaxial cylindrical components connected together, the inner cylindrical component having an inner surface for connection to the surface of said core and the outer cylindrical component having said embossing pattern on its outer surface. In practice, the inner cylindrical component can be made from glass fiber reinforced plastic and the outer cylindrical component can be made from an elastomeric material, for example ebonite, although the use of other materials is not ruled out, provided that the outer component has sufficient hardness and that the overall elasticity is such that a slight deformation is permitted at the time of fitting on the core or removal from the core.

In a possible embodiment, the mechanical sleeve locking bracket can have a tooth which is inserted into a recess formed in the edge of the interchangeable sleeve. In particular, when the sleeve is formed with an elastomeric outer cylindrical component, it is advantageous to provide at each end of the sleeve an essentially rigid ring, within which is formed one or more recesses for one or more appendages of the locking bracket. This makes it possible to avoid forming notches, which could form possible points of initiation of rupture, in the cylindrical components forming the sleeve. Additionally, the ring can be made from steel or other hard material which provides sufficient strength in the area in which the forces applied by the appendage of the locking bracket are concentrated.

In a different embodiment, each of said mechanical locking members comprises a conical forcing surface which interacts with a complementary conical surface portion formed at each end of said interchangeable sleeve.

Further advantageous embodiments of the cylinder according to the invention are indicated in the attached claims.

The invention also relates to a cylindrical interchangeable sleeve for a rotating cylinder for processing a web material, where the cylinder comprises a substantially rigid central core on which said interchangeable sleeve is fixed angularly and axially, said interchangeable sleeve having a relief pattern on its outer cylindrical surface, and being characterized in that it comprises, at each end, an element for fixing to a mechanical locking member for locking said interchangeable sleeve with respect to said core.

Further advantageous characteristics of the sleeve according to the invention are indicated in the attached dependent claims.

BRIEF DESCRIPTION OF THE DRAWINGS

The invention will be more clearly understood from the description and the attached drawing, which shows a non-restrictive practical example of the invention. In the drawing.

FIG. 3 shows in a greatly enlarged longitudinal section one end of the embossing cylinder in a first embodiment;

FIG. 4 shows a view taken on IV-IV as marked in FIG. 3;

FIG. 5 shows a view taken on V-V as marked in FIG. 3; and

FIGS. 6 and 7 show two greatly enlarged details of the two opposite ends of the embossing cylinder in a second embodiment.

DETAILED DESCRIPTION OF THE PREFERRED EMBODIMENTS OF THE INVENTION

Figure 1:
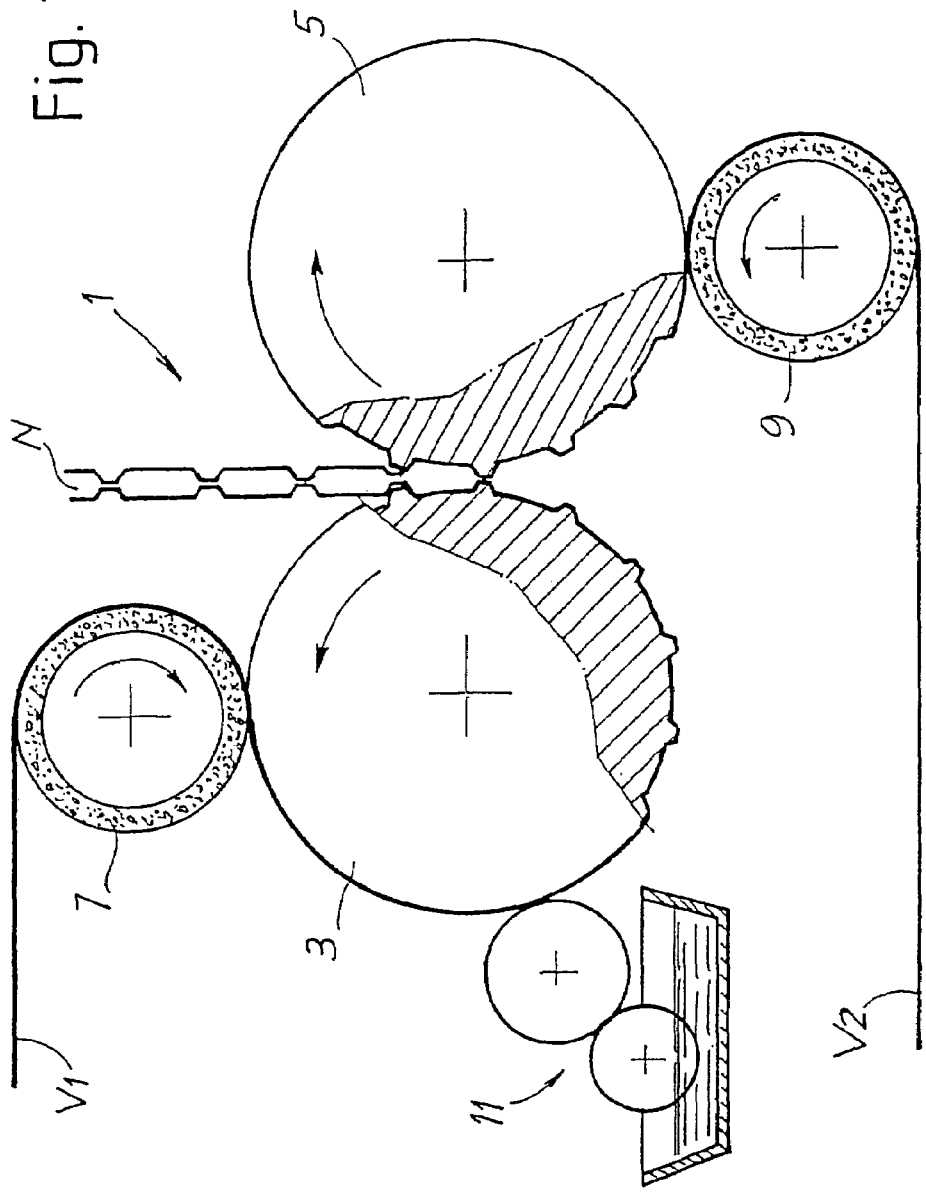
FIG. 1 shows schematically an embossing machine in which the present invention can be applied.

FIG. 1 shows in a highly schematic way an embossing machine, indicated in a general way by 1, in which the present invention can be applied. However, it should be understood that the fundamental principles of the invention are also applicable to the production of embossing cylinders for use in embossing machines of other types, for example "nested" machines or single embossing devices. The invention can also be used for the production of cylinders for processing web materials, in order to carry out operations other than embossing, for example printing or other processes which may require the rapid replacement of an interchangeable sleeve fitted on the cylinder, wherever problems of angular slipping between an interchangeable sleeve and the central core of the cylinder occur.

The embossing machine 1 is of what is known as the tip-to-tip type, and has a first embossing cylinder 3 and a second embossing cylinder 5, each provided with an interchangeable sleeve. The structure of the embossing cylinders is described in detail below. The embossing pattern, consisting of a plurality of protuberances, is formed on the outer surfaces of the embossing cylinders. The embossing cylinders 3 and 5 interact with corresponding pressure rollers 7 and 9. A first ply of web material, indicated by V1, passes between the pressure roller 7 and the embossing cylinder 3, and is embossed there. A second ply, indicated by V2, is embossed between the pressure roller 9 and the embossing cylinder 5. The two embossed plies are laminated and joined in the nip between the embossing cylinders 3 and 5 to form the web material N. The joining is carried out by means of adhesive applied by an adhesive dispenser 11.

Figure 2:
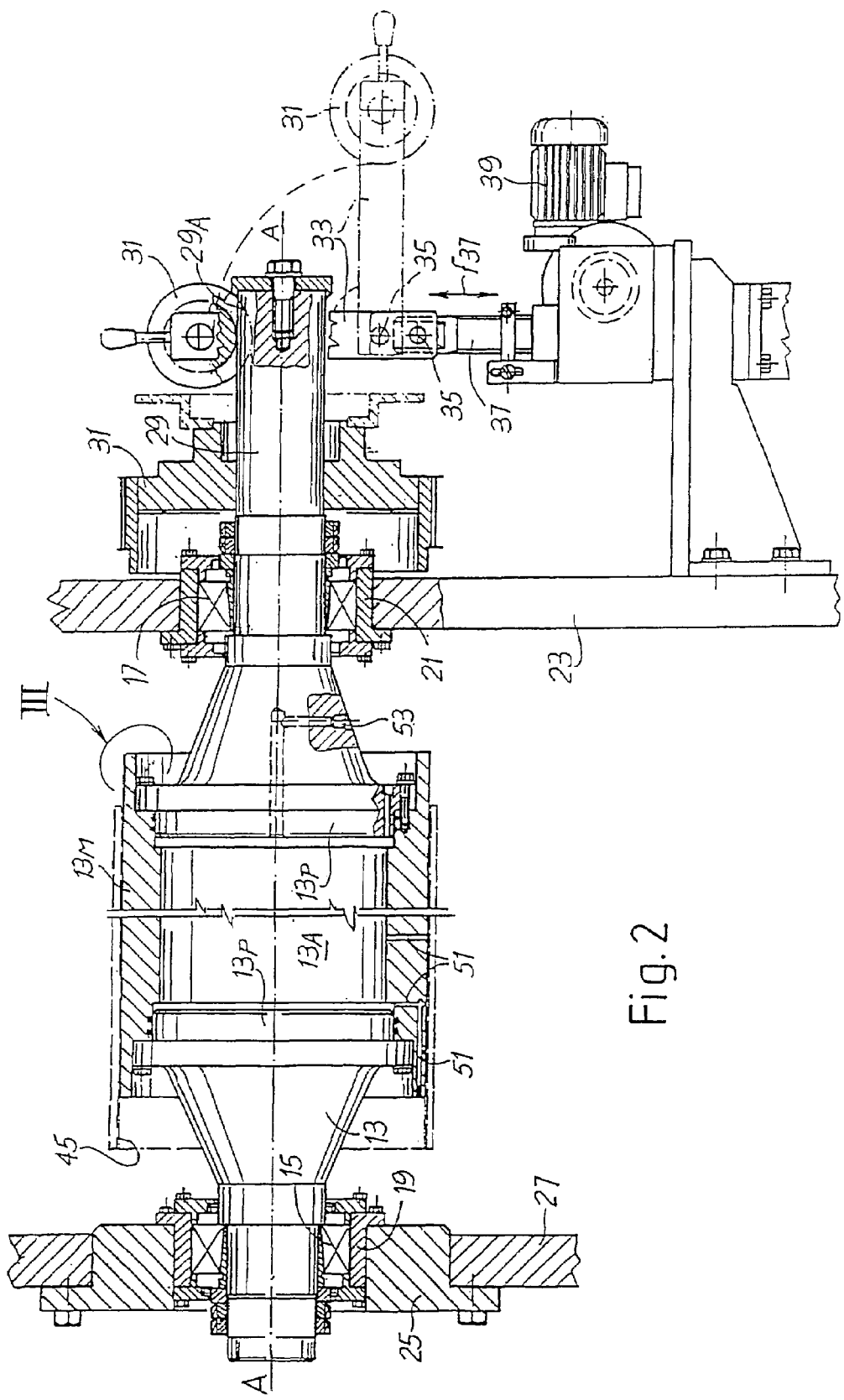
FIG. 2 shows a side view, in partial longitudinal section, of an embossing cylinder.

The structure of the embossing machine described here in summary form is known, and will not be illustrated in greater detail in this document. FIG. 2 shows one of the two embossing cylinders 3 and 5. These can be essentially identical to each other, and therefore only one of them, in particular the cylinder 3, will be illustrated in greater detail. It has a cylindrical central core 13 extending along the axis of the embossing cylinder and supported at its ends by bearings 15 and 17 housed in bushes 19 and 21. In the illustrated example, the core 13 is formed by two flanged end shanks 13P, which terminate and support a cylindrical shell 13M. The two shanks are inserted into the bearings 15 and 17.

The bush 21 is mounted directly in a side piece 23 of the embossing machine, while the bush 19 is inserted into a flange 25 fixed to the second side piece 27 of the embossing machine and releasable therefrom. The shank 29 of the cylindrical core 13 extends beyond the bearing 17 and on said shank is keyed a pulley 31 which imparts the motion to the embossing cylinder. The shank 29 extends beyond the pulley 31 to form an end 29A which can be engaged by a bracket 33 hinged at 35 to a rod 37 which can be moved vertically by an actuator 39 as shown by the arrow f37. FIG. 2 shows the two possible positions of the bracket 33. In the first position, shown in solid lines, the bracket 33 is in a vertical configuration and engages the end 29A of the shank 29 with a shaped wheel 41. When the bracket 33 is in this position, the actuator 39 is operated until the bearing contained in the bush 29 is completely released from the weight of the cylinder. At this point, the flange 25 can be removed, and the embossing cylinder 3 can be cantileverly retained by the bearing 17 only, so that the interchangeable sleeve can be replaced by the methods described below. In the position shown in broken lines, the bracket 33 is in a horizontal configuration and the embossing cylinder 3 can rotate about its axis indicated by A-A.

An interchangeable sleeve, indicated in a general way by 45, is fitted on the core 13 of the embossing cylinder 3. The external diameter of the interchangeable sleeve 45 is smaller than the hole which remains free in the side piece 27 after the flange 25 has been extracted from it. Thus, the sleeve 45 can be extracted from the cylindrical core 13 and replaced with another by engaging the cylinder 3 with the bracket 33 and removing the flange 25 (so that the cylinder 3 is cantileverly retained).

The interchangeable sleeve 45 consists of two cylindrical components, which can be seen in particular in the section in FIG. 3, which shows an enlargement of the detail indicated by III of the right-hand end of the embossing cylinder of FIG. 2, with the interchangeable sleeve mounted and locked on the internal cylindrical core 13. The components forming the interchangeable sleeve 45 are indicated by 47 and 49. The internal cylindrical component 47 is advantageously made from glass fiber reinforced plastic, in other words with a structure consisting of a helical distribution of glass fibers in a matrix of polymerized resin. On the other hand, the cylindrical component 49 consists of a very hard elastomer, for example ebonite or a synthetic elastomer, whose hardness is equivalent and which is in any case suitable for the purposes for which the interchangeable sleeve is intended. The number 49A indicates the protuberances which are formed on the outer surface of the interchangeable sleeve, and which therefore consist of the material forming the outer cylindrical component 49 of said sleeve.

To facilitate the fitting of the sleeve 45 on the central core 13 and its removal therefrom, apertures are provided in the central core 13 so that the interior 13A of the core 13 communicates with the outer surface of the cylindrical shell 13M of the core, in other words with the surface on which the interchangeable sleeve 45 slides. In FIGS. 2 and 3, the numbers 51 indicate in a general way connecting ducts between the inside and the outside of the core 13 of the cylinder 3. When an interchangeable sleeve 45 is to be removed from the core 13, the cylinder 3 is first engaged by means of the bracket 33 and the flange 25 is removed, after which a connection 53 (FIG. 2) is used to pressurize the inside 13A of the core 13 and to expand the sleeve 45 by means of this pressure. The elasticity of the interchangeable sleeve 45 is sufficient to reduce the pressure exerted by the sleeve on the outer surface of the core 13, and thus the extraction of the sleeve 45 is facilitated. The air flowing between the inner surface of the sleeve 45 and the outer surface of the core 13 also acts as a lubricant, facilitating the sliding of the two components with respect to each other. The fitting of a new interchangeable sleeve with a different embossing pattern is facilitated in a similar way. The compressed air inside the sleeve 13 is introduced by means of a duct connected to a source of compressed air (not shown) which is connected to a connection 53 formed in the shank 29.

The elasticity of the interchangeable sleeve 45 is sufficient to lock said sleeve axially and angularly on the core 13 except in the presence of differential thermal expansion of these two components and/or high tangential forces. However, when the embossing device is operating, the dissipation of heat caused by the high pressures between the embossing cylinder 3 and the corresponding pressure roller 7 causes an expansion of the interchangeable sleeve 45 by an amount sufficient to cause a slight angular displacement of said sleeve with respect to the core 13. Since the embossing cylinders 3 and 5 are kept in synchronization with reference to the rotary movement of the cores 13, the slippage between the core and the interchangeable sleeve 45 fitted on it ultimately causes a misalignment of the embossing patterns between the two cylinders.

In order to overcome this drawback, in the embodiment shown in FIGS. 3, 4 and 5 an end-fitted angular locking system is provided at each end of the embossing cylinder 3. The two systems are essentially identical, and therefore only the right-hand end (FIG. 2) of the embossing cylinder is shown in the drawing. As shown in the drawing, at least one bracket 61 is fixed on the end face of the core 13 of the embossing cylinder 3, by means of screw members 63 which are engaged in holes formed in the thickness of the cylindrical shell 13M of the cylindrical core 13. A spacer 65 is placed between the end face 13F of the cylindrical shell 13M of the core 13 and the bracket 61. This prevents the axial crushing of the sleeve between the two opposite brackets 61.

In the illustrated example, the bracket 61 extends only over a fraction of the circular extension of the end face of the core 13, but there is no reason why the bracket 61 should not have an annular shape, and therefore an extension of 360°.

The bracket 61 has a tooth 61A parallel to the axis A-A of the embossing cylinder 3. The tooth 61A is inserted into an edge notch or recess 67 formed in a terminal ring 69 integral with the inner cylindrical component 47 of the interchangeable sleeve 45. The terminal ring 69 is advantageously made from a rigid material, for example steel. It is housed within the overall thickness of the interchangeable sleeve 45, since the axial length of the outer cylindrical component 49 is smaller than that of the cylindrical component 47. The difference between the lengths of the two components is approximately equal to twice the axial extension of the ring 69, since a terminal ring is located on the opposite end (not illustrated) of the interchangeable sleeve 45.

The internal diameter of the inner cylindrical component 47 at the position of the rigid ring 69 is slightly greater than that of the rest of the component, to facilitate the fitting of the sleeve 45 in spite of the lack of radial expandability of the sleeve at the position of the ring 69.

Thus the interchangeable sleeve 45 can be angularly locked with respect to the core by locking at least one bracket 61 on each of the two ends of the inner core 13. It is also possible to provide a plurality of end brackets 61 on each end, and/or brackets having more than one tooth 61A each, to obtain a better distribution of stresses.

FIGS. 6 and 7 show an enlargement of the two opposite ends of the embossing cylinder 3 in a different embodiment. Identical numbers indicate identical or corresponding parts in the two embodiments.

In this configuration, the brackets provided at the two ends of the embossing cylinder 3 are indicated by 61 and 62 respectively, and their shapes are slightly different from each other, for reasons which are explained below.

The right-hand end (with reference to the configuration in FIG. 2) of the core 13 of the embossing cylinder 3 has an annular shoulder 13S on which the interchangeable sleeve 45 bears, while the opposite end has no shoulder (FIG. 7), thus enabling the interchangeable sleeve to be fitted and removed.

At each of its two ends, the interchangeable sleeve 45 has an end area with a conical surface, indicated by 45B, on its outer surface. The conical surfaces 45B are tapered towards the corresponding edges of the sleeve. Each of the brackets 61 and 62 has a corresponding conical surface, indicated by 61A and 62A respectively, whose shape is complementary to that of the surfaces 45B. The conical surfaces 61A and 61B can have an extension of 360°, thus covering the whole edge of the sleeve. Alternatively, they can have a smaller extension and take the form of appendages distributed suitably along the circumferential extension of the cylinder. Thus, when each bracket 61 and 62 is frontally pressed against the corresponding end face 13F of the core 13, the interchangeable sleeve 45 is locked angularly as a result of the interaction of the two conical surfaces 45B and 62A, or 45B and 61A, and the consequent pressure of the interchangeable sleeve against the cylindrical shell 13M of the core 13.

In the illustrated example, the brackets 61 and 62 have an annular extension. The bracket 61 is shaped in such a way that it can be centered and guided onto the shoulder 13S during the tightening movement, while the bracket 62 is shaped to be centered and guided onto the cylindrical surface of smaller diameter 13T formed on the corresponding end of the core 13. The two brackets 61 and 62 could have a partial extension instead of a full annular extension. In this case they will be guided and centered also onto the inner edge of the shell 13M.

It is to be understood that the drawing shows only an example provided solely as a practical demonstration of the invention, and that this invention can be varied in its forms and arrangements without departure from the scope of the guiding principle of said invention. The presence of any reference numbers in the attached claims has the sole purpose of facilitating reading with reference to the attached drawings and to the preceding text, and does not limit the scope of protection of the claims.

The invention claimed is:

1. A rotating cylinder for processing a web material, comprising an essentially rigid cylindrical core on which is fitted an interchangeable sleeve of elastically expandable material whose rigidity is less than that of material of the core, said sleeve being axially and angularly fixable to said core and being provided on an outer surface thereof with a relief pattern, wherein, at each end of the cylinder, at least one corresponding mechanical locking member is present which can be fixed to a corresponding end of the core of the cylinder and which interacts with a corresponding end of the interchangeable sleeve to lock said interchangeable sleeve angularly with respect to the core of the cylinder, wherein each said mechanical locking member comprises a bracket which fits onto an end face of the cylinder which is provided with at least one appendage extending onto a cylindrical surface of the cylinder and engages the interchangeable sleeve, wherein said interchangeable sleeve is formed from two coaxial cylindrical components fixed rigidly to each other, an inner cylindrical component thereof having an inner surface for connection to a surface of said core and an outer cylindrical component having said embossing pattern on an outer surface thereof, and wherein said interchangeable sleeve comprises, at each end, an essentially rigid ring, within which is formed one or more recesses for one or more of said at least one appendage.

2. The cylinder according to claim 1, wherein the inner cylindrical component has an axial length which is greater than that of the outer cylindrical component and projects from the outer cylindrical component at both ends, and wherein an essentially rigid ring is placed around each edge of said inner cylindrical component.

3. The cylinder according to claim 2, wherein said inner cylindrical component has an end portion with an increased internal diameter at a position of each said essentially rigid ring.

4. A rotating cylinder for processing a web material, comprising an essentially rigid cylindrical core on which is fitted an interchangeable sleeve of elastically expandable material whose rigidity is less than that of material of the core, said sleeve being axially and angularly fixable to said core and being provided on an outer surface thereof with a relief pattern, wherein, at each end of the cylinder, at least one corresponding mechanical locking member is present which can be fixed to a corresponding end of the core of the cylinder and which interacts with a corresponding end of the interchangeable sleeve to lock said interchangeable sleeve angularly with respect to the core of the cylinder, wherein each said mechanical locking member comprises a bracket which fits onto an end face of the cylinder which is provided with at least one appendage extending onto a cylindrical surface of the cylinder and engages the interchangeable sleeve, wherein each said mechanical locking member comprises a conical forcing surface which interacts with a complementary conical surface portion formed at each end of said interchangeable sleeve, and wherein said locking member comprises a centering and guide surface interacting with a corresponding centering and guide surface integral with the core of the cylinder.

5. The cylinder according to claim 4, wherein said core of the cylinder comprises at one end of said core a projecting annular stop on which said sleeve bears.

6. The cylinder according to claim 5, wherein said projecting annular stop forms a centering and guide surface integral with the core of the cylinder.

* * * * *